United States Patent
Fennell

(10) Patent No.: US 6,729,817 B1
(45) Date of Patent: May 4, 2004

(54) STACKABLE SHIPPING TRAILER

(76) Inventor: Robert J. Fennell, 4507 Rome Rd., Dunlap, IL (US) 61523

( * ) Notice: Subject to any disclaimer, the term of this patent is extended or adjusted under 35 U.S.C. 154(b) by 0 days.

(21) Appl. No.: 10/154,602

(22) Filed: May 23, 2002

(51) Int. Cl.$^7$ .................................................. B60P 7/00
(52) U.S. Cl. ............................. 410/56; 410/66; 410/68; 280/423.1
(58) Field of Search .............................. 410/56, 66, 68, 410/35, 46; 280/423.1; 220/1.5, 23.6; 24/287

(56) References Cited

U.S. PATENT DOCUMENTS

| | | | | |
|---|---|---|---|---|
| 4,950,114 A | * | 8/1990 | Borchardt | 410/82 |
| 4,986,705 A | * | 1/1991 | Durkin | 410/57 |
| 5,183,375 A | * | 2/1993 | Fenton et al. | 410/35 |
| 6,210,088 B1 | * | 4/2001 | Crosby | 410/35 |
| 6,241,438 B1 | * | 6/2001 | Corbett et al. | 410/56 |
| 6,364,584 B1 | * | 4/2002 | Taylor | 410/94 |

* cited by examiner

Primary Examiner—Stephen T. Gordon
(74) Attorney, Agent, or Firm—Norman E. Lehrer

(57) ABSTRACT

Stackable shipping containers are disclosed that can also act as trailers to be pulled by standard tractor trucks for travel over the road. Each of the stackable shipping trailers includes a substantially rectangularly shaped container having an interior capable of holding equipment or freight therein. The container is comprised essentially of two side walls, a front wall, a rear wall, a bottom wall and a top wall which form a substantially rectangularly shaped box having four top corners and four bottom corners. A standard corner casting is located in each of the corners. Extending rearwardly of said container is a frame supporting a pair of wheels that extend downwardly below the level of the bottom wall. A front support frame extends forwardly of the front wall and supports a downwardly facing pin and bearing plate that are adapted to be engaged by the fifth wheel of a tractor truck. As a result of this construction, one trailer can be stacked directly on top of another without interference by the wheels or bearing plate and pin. The two stacked trailers can be secured together by the use of the mating corner castings.

5 Claims, 3 Drawing Sheets

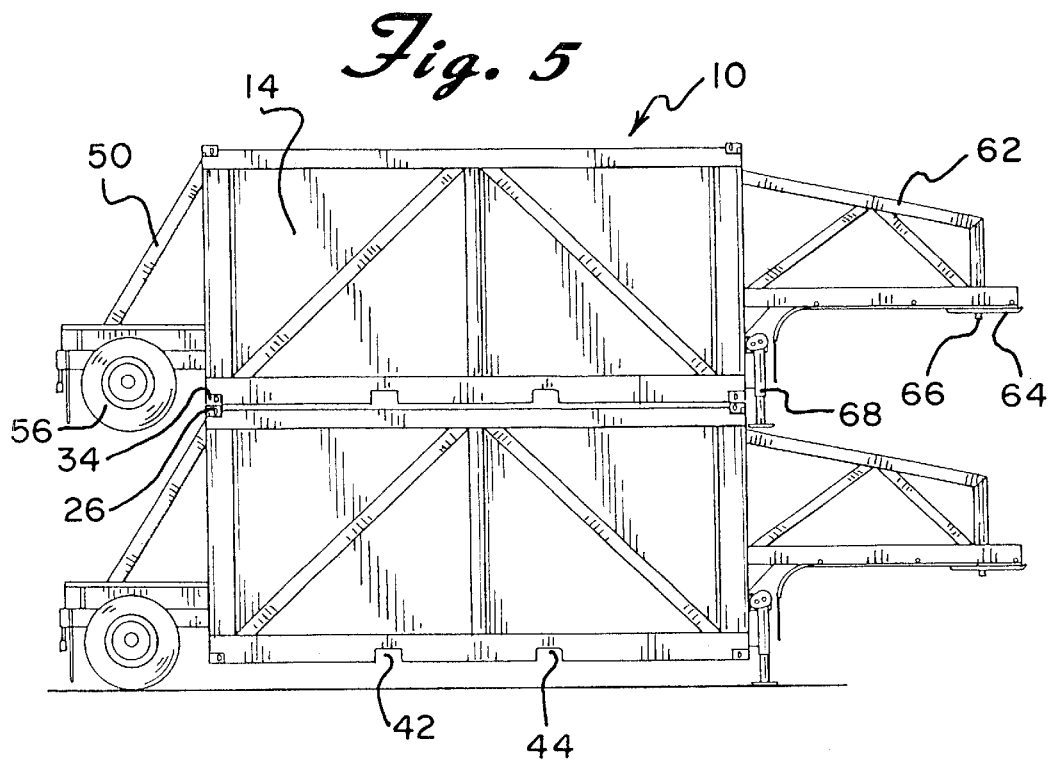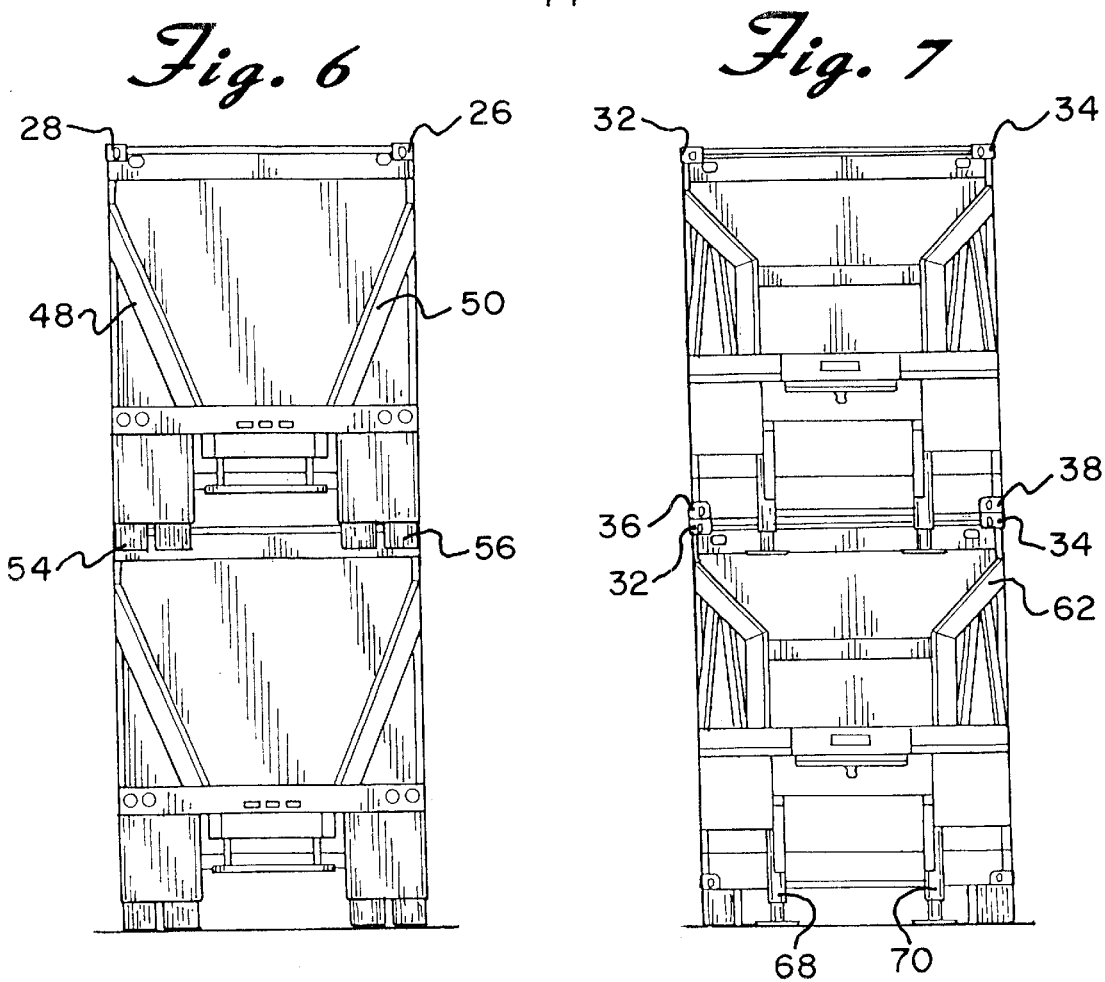

STACKABLE SHIPPING TRAILER

BACKGROUND OF THE INVENTION

The present invention is directed toward stackable shipping containers and more particularly, toward wheeled trailer-like shipping containers which are also stackable and which can be towed directly by a truck.

Goods and merchandise of substantially all kinds are frequently shipped in large containers. This system, typically referred to as containerized freight utilizes closed box shaped containers capable of holding very large quantities of merchandise. The containers are frequently carried in the hold of a ship or on a barge or the like. At port, the containers can be transferred to a flatbed rail car or onto the flat bed of a truck trailer.

While the containers may vary slightly from each other, the majority of them are of substantially the same size and shape in accordance with I.S.O. standards promulgated by the International Standards Organization. As is well known in the art, each container has I.S.O. standard corner castings at the upper and lower eight corners thereof which allow the containers to be stacked and connected together and to be connected to the ship, rail car or trailer. Because the containers and corner castings are standardized, substantially any container, regardless of the manufacturer, can be carried by any ship, rail car or trailer and different containers can be connected together.

While the use of standardized containers is convenient and may save considerable time and expense, the final delivery of the merchandise still requires that the same either be off-loaded into the trailer of a tractor trailer for transport over land or the container can be loaded onto a flat bed trailer for such transport. Either system requires that a trailer be present at the dock or rail freight yard for transporting the containers.

It is, of course, theoretically possible to transport the trailers of tractor trailer trucks directly by ship or rail car. However, such trailers are not normally constructed to be sturdy enough for such transport. Furthermore, conventional trailers are not capable of being stacked and, therefore, would waste considerable space on a ship or rail car.

In addition to being used to ship merchandise and the like, such standardized shipping containers have recently been used to house portable operating machinery such as generators, power plants and the like. Thus, when a large generator is temporarily needed at a construction site, it can be delivered on a flat bed trailer. When not in use, the containerized power plant can be stacked with others for storage until needed and then shipped to the site. As with the containers used for shipping containerized freight, however, delivery of the containerized power plant requires the use of a trailer and truck tractor and additional equipment such as a heavy duty fork lift at the site for removing the container from the trailer. Otherwise, the trailer will also have to remain idle at the site.

SUMMARY OF THE INVENTION

The present invention is designed to overcome the deficiencies of the prior art discussed above. It is an object of the present invention to provide shipping containers which are trailer-like and are stackable.

It is another object of the present invention to provide shipping containers that can be stacked for transport on a rail car, ship or transport plane but which can also be pulled over the road by a standard tractor trailer.

In accordance with the illustrative embodiment demonstrating features and advantages of the present invention, there are provided shipping containers which are stackable and act as a trailer. Each of the stackable shipping trailers includes a substantially rectangularly shaped container having an interior capable of holding equipment or freight therein. The container is comprised essentially of two side walls, a front wall, a rear wall, a bottom wall and a top wall which form a substantially rectangularly shaped box having four top corners and four bottom corners. A standard corner casting is located in each of the corners. Extending rearwardly of said container is a frame supporting a pair of wheels that extend downwardly below the level of the bottom wall. A front support frame extends forwardly of the front wall and supports a downwardly facing pin and bearing plate that are adapted to be engaged by the fifth wheel of a tractor truck. As a result of this construction, one trailer can be stacked directly on top of another without interference by the wheels or bearing plate and pin. The two stacked trailers can be secured together by the use of the mating corner castings.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings forms which are presently preferred; it being understood that the invention is not intended to be limited to the precise arrangements and instrumentalities shown.

FIG. 5 is a side elevational view similar to FIG. 2 but showing two shipping trailers stacked onto each other;

FIG. 6 is a rear elevational view of the stacked shipping trailers of FIG. 5;

FIG. 7 is a front elevational view of the stacked shipping trailers of FIG. 5;

DETAILED DESCRIPTION OF THE PREFERRED EMBODIMENT

Figure 1:
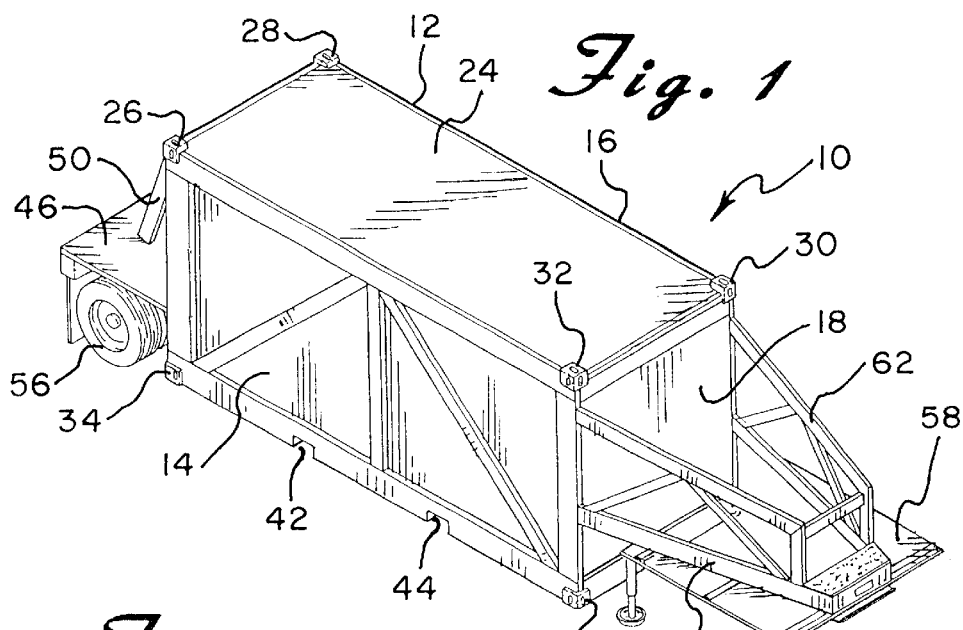
FIG. 1 is a front, side and top prospective view of a first embodiment of a stackable shipping trailer illustrating the present invention.
Figure 2:
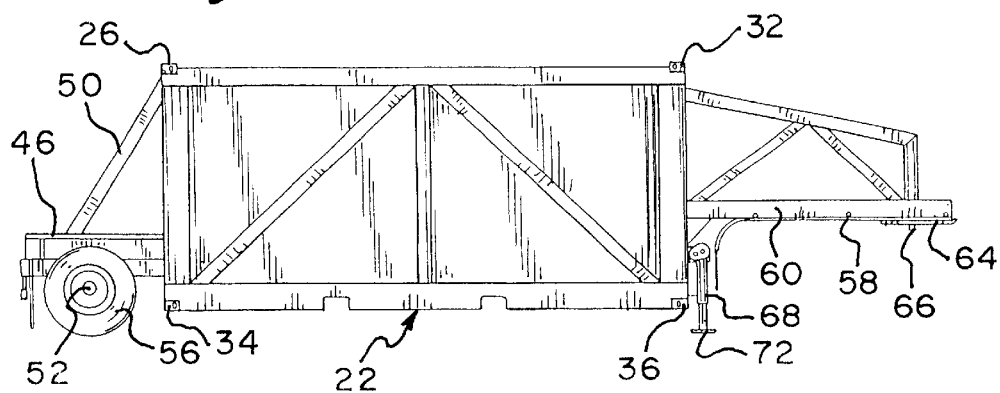
FIG. 2 is a side elevational view of the shipping trailer of FIG. 1.

Referring now to the drawings in detail wherein like reference numerals have been used throughout the various figures to designate like elements, there is shown in FIG. 1 a stackable shipping trailer constructed in accordance with the principles of the present invention and designated generally as 10.

Figure 3:
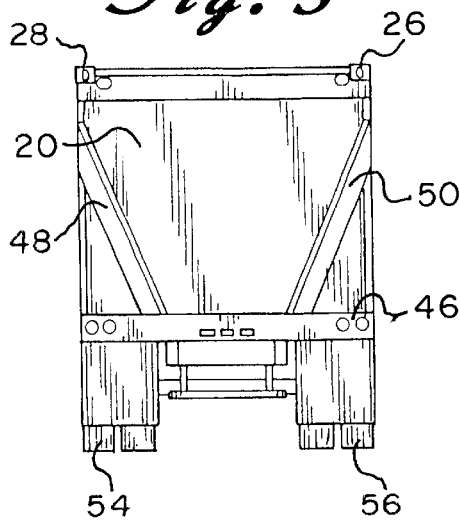
FIG. 3 is a rear elevational view thereof.
Figure 4:
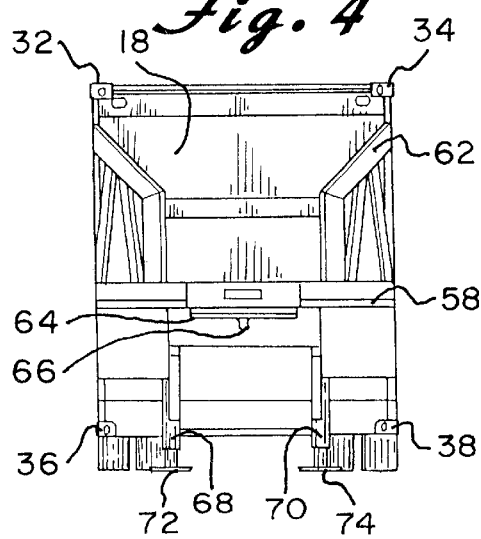
FIG. 4 is a front elevational view thereof.

Each of the shipping containers essentially includes a substantially rectangularly shaped container 12 having an interior capable of holding merchandise, freight or equipment. The container 12 includes left and right side walls 14 and 16, a front wall 18, a rear wall 20 (see FIG. 3), a bottom wall 22 and a top wall 24. The six walls 12, 14, 18, 20, 22 and 24 form a substantially rectangularly shaped box having four top corners and four bottom corners. Located in each of these eight corners is a corner casting such as shown at 26, 28, 30, 32, 34, 36 and 38. The container 12 thus far described is essentially of conventional construction and is, per se, known in the art.

The corner castings are also, per se, known in the art as is the combination of the corner castings with the container body. Such containers can be stacked on top of each other as shown in FIGS. 5–9 or placed side-by-side and interconnected utilizing locking mechanism that interconnect adjacent corner castings. Since these locking mechanisms are also well known in the art, they are not being described herein.

As is also well known in the shipping container art, the containers need not have complete side, front and back or top walls. Obviously the bottom wall 22 is required in order to support the merchandise or equipment therein. The containers can, however, have only partial side or top walls or only a frame with essentially no such walls. Furthermore, the rear wall 20 and/or one or more of the other walls may be comprised of doors or have a door therein to allow for access to the interior of the container. In addition, and is also well known in the art, the bottom wall may include a pair of recesses 42 and 44 therein which can be engaged by a heavy duty forklift for lifting the containers for moving the same or for stacking one container on top of another.

The shipping container 12 of the present invention differs from conventional shipping containers in that it can also be used as a trailer to be pulled by a tractor truck. In order to accomplish this, a rear support frame in the form of a horizontal platform 46 and a pair of diagonally extending struts 48 and 50 extend rearwardly from the rear of the container 12. The rear support frame supports an axle 52 upon which are rotatably mounted a plurality of wheels such as shown at 54 and 56. As best shown in FIGS. 2, 5, 8 and 9, the wheels 54 and 56 extend downwardly below the level of the bottom wall 22 so that when the wheels are located on a road or other horizontal surface, the bottom wall 22 is raised above the level of the road.

Extending forwardly of the front wall 18 is a front support frame which may include a horizontal platform 58 rigidly supported by a plurality of support struts 60 and 62. Located adjacent the forward end of the platform 58 and facing downwardly is a bearing plate 64 and pin 66. The pin 66 and bearing plate 64 are adapted to be coupled to the fifth wheel of a tractor truck in a manner well known in the art. The platform 58 and one or more of the struts 60 and 62 also carry vertically extending legs 68 and 70 with adjustment feet 72 and 74 which can be used to support the trailer 10 in a level condition when the same is not mounted on a tractor truck.

As shown best in FIGS. 5, 6 and 7, the shipping trailers 10 can be stacked on or top of the other for shipping or storage. In the stacked condition, the four lower corner castings of the upper trailer rest directly on and engage the four top corner castings of the trailer directly there beneath. Known locking means can then be used to attach the trailers together. When stacked, the lower trailer does not interfere with the wheels 54 and 56 of the upper trailer since the wheels overlie the open space beyond the rear wall of the lower trailer as shown best in FIG. 5. Similarly, the front support frames of the stacked trailers do not interfere with each other nor does any other part of the trailer interfere with the front support frames. While FIGS. 5, 6 and 7 show the trailers 10 stacked on top of each other, it should be readily apparent that they can also be placed side-by-side and locked together using the corner castings, if desired.

Figure 8:
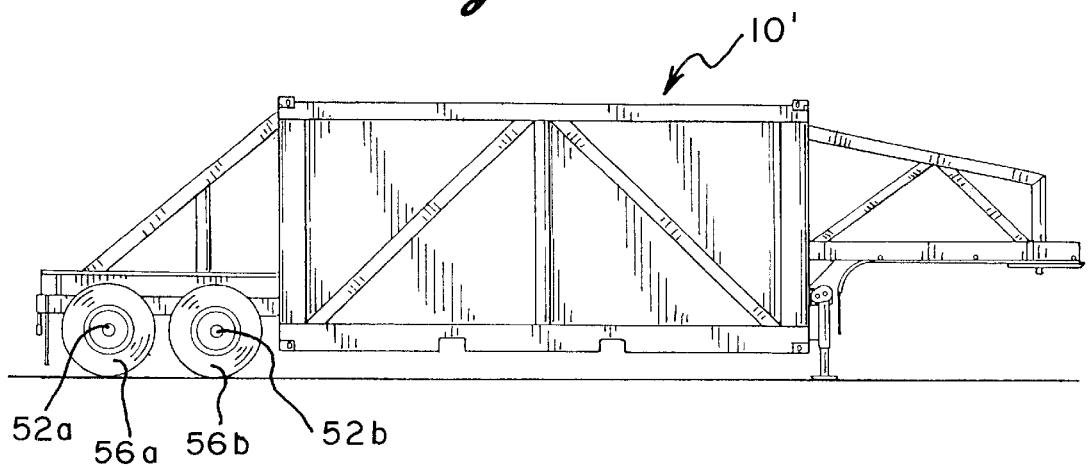
FIG. 8 is a side elevational view similar to FIG. 2 but showing a slightly modified form of a shipping trailer.
Figure 9:
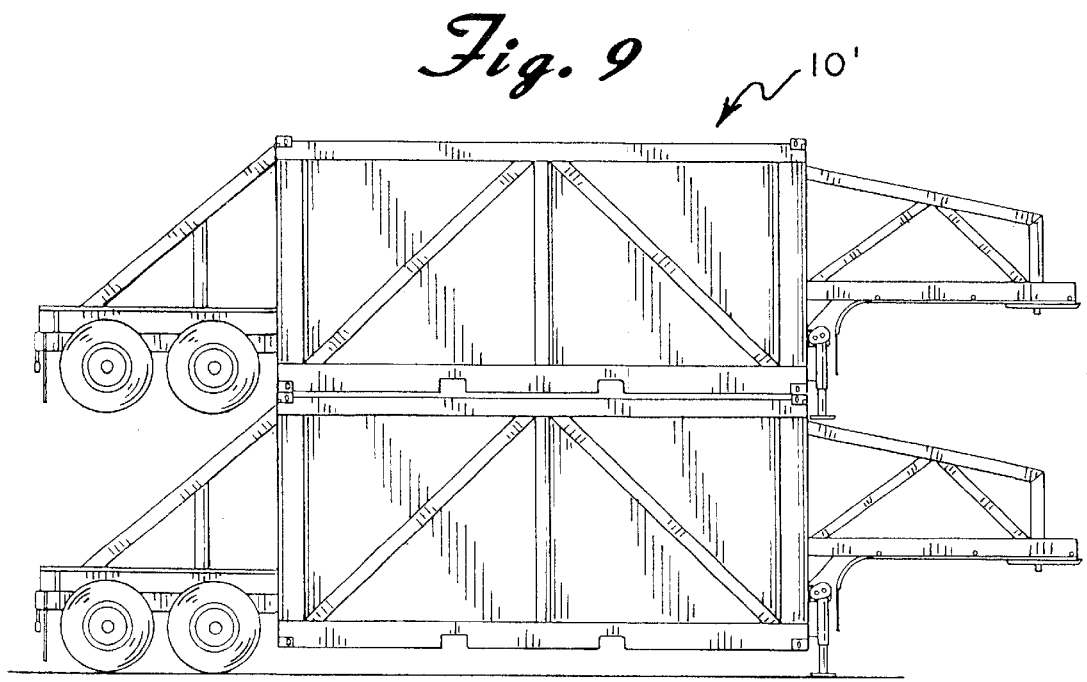
FIG. 9 is a side elevational view similar to FIG. 8 but showing two of the modified shipping trailers stacked onto each other.

A slightly modified form of the invention 10 is shown in FIGS. 8 and 9. In lieu of the single axle 52 supporting wheels 54 and 56, the embodiment shown in FIGS. 8 and 9 utilizes two axles, 52a and 52b arranged one directly behind the other. As a result, in this embodiment, the rear support frame can support two pairs of wheels in tandem such as shown at 5a and, 54b in FIGS. 8 and 9. The embodiments shown in FIGS. 8 and 9 otherwise are constructed and function in substantially the same manner as the first embodiment described above.

The present invention may be embodied in other specific forms without departing from the spirit or essential attributes thereof and accordingly, reference should be made to the appended claims rather than to the foregoing specification as indicating the scope of the invention.

I claim:

1. A stackable shipping trailer comprising:

a substantially rectangularly shaped container having an interior capable of holding equipment or freight therein;

said container being comprised of two side walls, a front wall, a rear wall a bottom wall and a top wall, said walls defining four top corners and four bottom corners;

eight corner castings, each corner casting being secured to a different one of said corners;

a rear support frame extending rearwardly of said container, said rear support frame supporting a pair of wheels that extend downwardly below the level of said bottom wall, and a front support frame extending forwardly of said front wall, said front support frame supporting a downwardly facing pin and bearing plate.

2. The stackable shipping trailer as claimed in claim 1 wherein said pin and bearing plate are adapted to be coupled to the fifth wheel of a tractor truck.

3. The stackable shipping trailer as claimed in claim 1 wherein said corner castings located at said four top corners can be engaged by the bottom four corner castings of a similarly constructed trailer stacked directly thereabove.

4. The stackable shipping trailer as claimed in claim 1 wherein said rear support frame support second pair of wheels in tandem with said first mentioned pair of wheels.

5. The stackable shipping trailer as claimed in claim 1 wherein said bottom wall includes a pair of spaced apart recesses therein for engagement by a fork lift for lifting said trailer.

* * * * *